United States Patent
Bugosh

(10) Patent No.: US 6,539,821 B2
(45) Date of Patent: Apr. 1, 2003

(54) RACK AND PINION STEERING GEAR WITH LOW FRICTION YOKE ASSEMBLY

(75) Inventor: Mark J. Bugosh, Sterling Heights, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/803,212

(22) Filed: Mar. 9, 2001

(65) Prior Publication Data

US 2002/0124670 A1 Sep. 12, 2002

(51) Int. Cl.[7] .................................................. F16H 1/04
(52) U.S. Cl. ........................................................ 74/422
(58) Field of Search .................................. 74/422, 498

(56) References Cited

U.S. PATENT DOCUMENTS

| | | |
|---|---|---|
| 4,531,603 A | 7/1985 | VanCise, Jr. |
| 4,553,447 A | 11/1985 | Betz |
| 4,619,155 A | 10/1986 | Futaba |
| 4,762,014 A | 8/1988 | Sano |

*Primary Examiner*—Jack Lavinder
*Assistant Examiner*—Benjamin A. Pezzlo
(74) *Attorney, Agent, or Firm*—Tarolli, Sundheim, Covell & Tummino L.L.P.

(57) ABSTRACT

A rack and pinion steering gear (10) comprises a housing (12). A yoke assembly (40) is in the housing (12) for at least partially supporting and guiding movement of a rack bar (34) relative to a pinion gear (26). The yoke assembly (40) comprises a yoke (42) and a plurality of rotatable members. The yoke (42) has a first end surface (48) and an axis (A) that extends transverse to the direction of movement of the rack bar (34). Each of the plurality of rotatable members is supported by the yoke (42). A portion of each rotatable member projects outward of the first end surface (48) of the yoke (42) for contacting the rack bar (34). Each rotatable member is rotatable about its axis and is fixed against movement along the yoke axis (A) relative to the yoke (42).

8 Claims, 2 Drawing Sheets

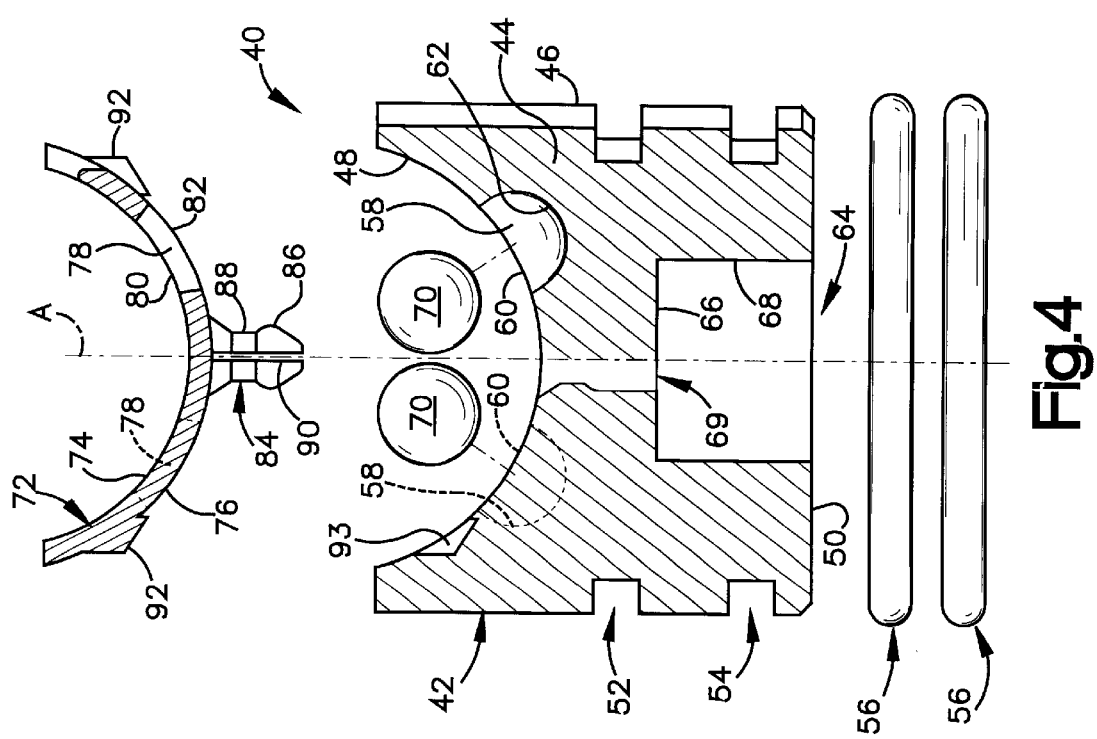
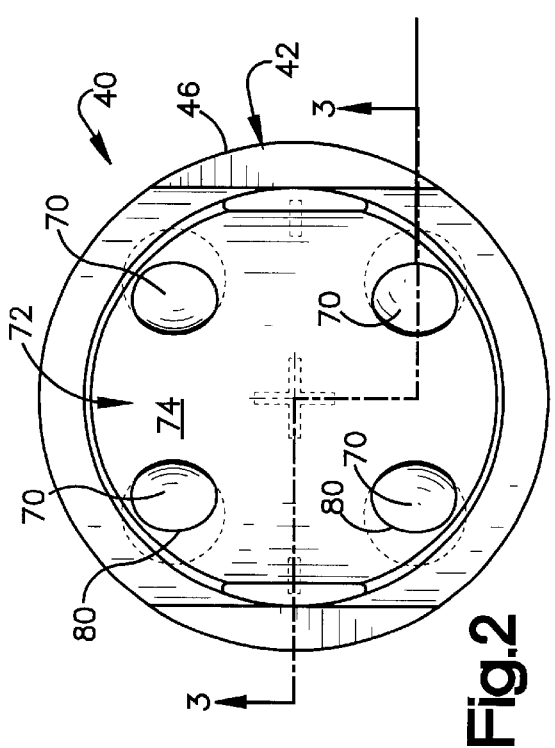
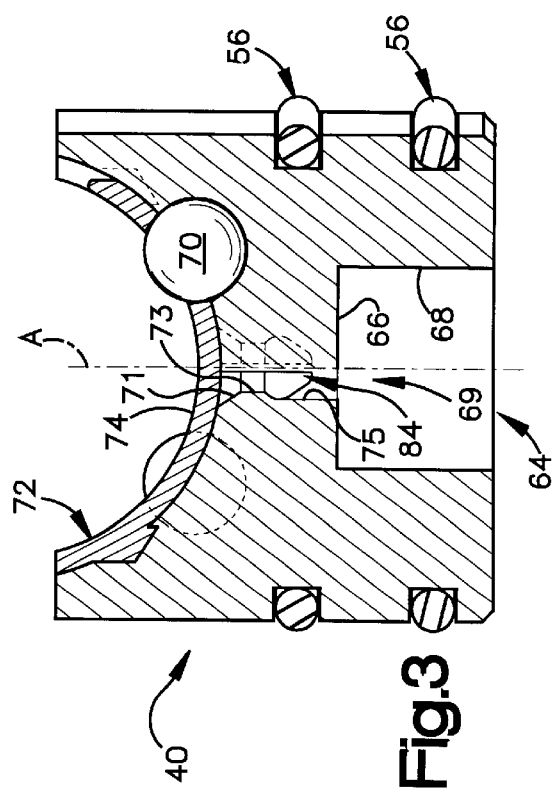

RACK AND PINION STEERING GEAR WITH LOW FRICTION YOKE ASSEMBLY

TECHNICAL FIELD

The present invention relates to a rack and pinion steering gear and, more particularly, to a rack and pinion steering gear having a low friction yoke assembly.

BACKGROUND OF THE INVENTION

A known rack and pinion steering gear includes a pinion gear that is rotatably mounted in a housing and is connected with a steering wheel of a vehicle. A rack bar extends through the housing and has opposite end portions connected with steerable vehicle wheels. Gear teeth formed on the rack bar are disposed in meshing engagement with gear teeth on the pinion gear. A yoke assembly is disposed in the housing to support and guide movement of the rack bar relative to the housing. The yoke assembly includes a yoke having an arcuate surface across which the rack bar moves. The support provided by the yoke assembly helps to ensure proper lash between the gear teeth of the rack bar and the gear teeth of the pinion gear.

During operation of this known rack and pinion steering gear, the yoke assembly may be subjected to both heat and high loads. The heat is produced due to friction between the rack bar and the yoke assembly as the rack bar moves across the arcuate surface of the yoke. A high load may occur, for example, when a vehicle hits a pothole in the road surface. The impact load of the vehicle tire with the pothole is transferred to the rack bar through the vehicle tie rods. The rack bar, in turn, transfers a portion of the load to the yoke assembly.

Both heat and high loads may cause a deflection in the yoke assembly. As a result, the yoke assembly may fail to properly support the rack bar and tooth wear on the rack bar and/or on the pinion gear may develop. Thus, a need exists for a low friction yoke assembly that provides sufficient support to the rack bar under high load conditions.

SUMMARY OF THE INVENTION

The present invention is a rack and pinion steering gear. The rack and pinion steering gear comprises a housing. A pinion gear is rotatably mounted in the housing. A rack bar is movable relative to the pinion gear. The rack bar has teeth in meshing engagement with teeth of the pinion gear. The rack and pinion steering gear further comprises a yoke assembly in the housing for at least partially supporting and guiding movement of the rack bar relative to the pinion gear. The yoke assembly comprises a yoke and a plurality of rotatable members. The yoke has a first end surface and an axis that extends transverse to the direction of movement of the rack bar. Each of the plurality of rotatable members is supported by the yoke. A portion of each rotatable member projects outward of the first end surface of the yoke for contacting the rack bar. Each rotatable member is rotatable about its axis and is fixed against movement along the yoke axis relative to the yoke.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 2 is a top view of the yoke assembly of FIG. 1;

FIG. 3 is a view of the yoke assembly taken along line 3—3 of FIG. 2; and

FIG. 4 is an exploded side view of the yoke assembly of FIG. 1.

DESCRIPTION OF PREFERRED EMBODIMENT

Figure 1:
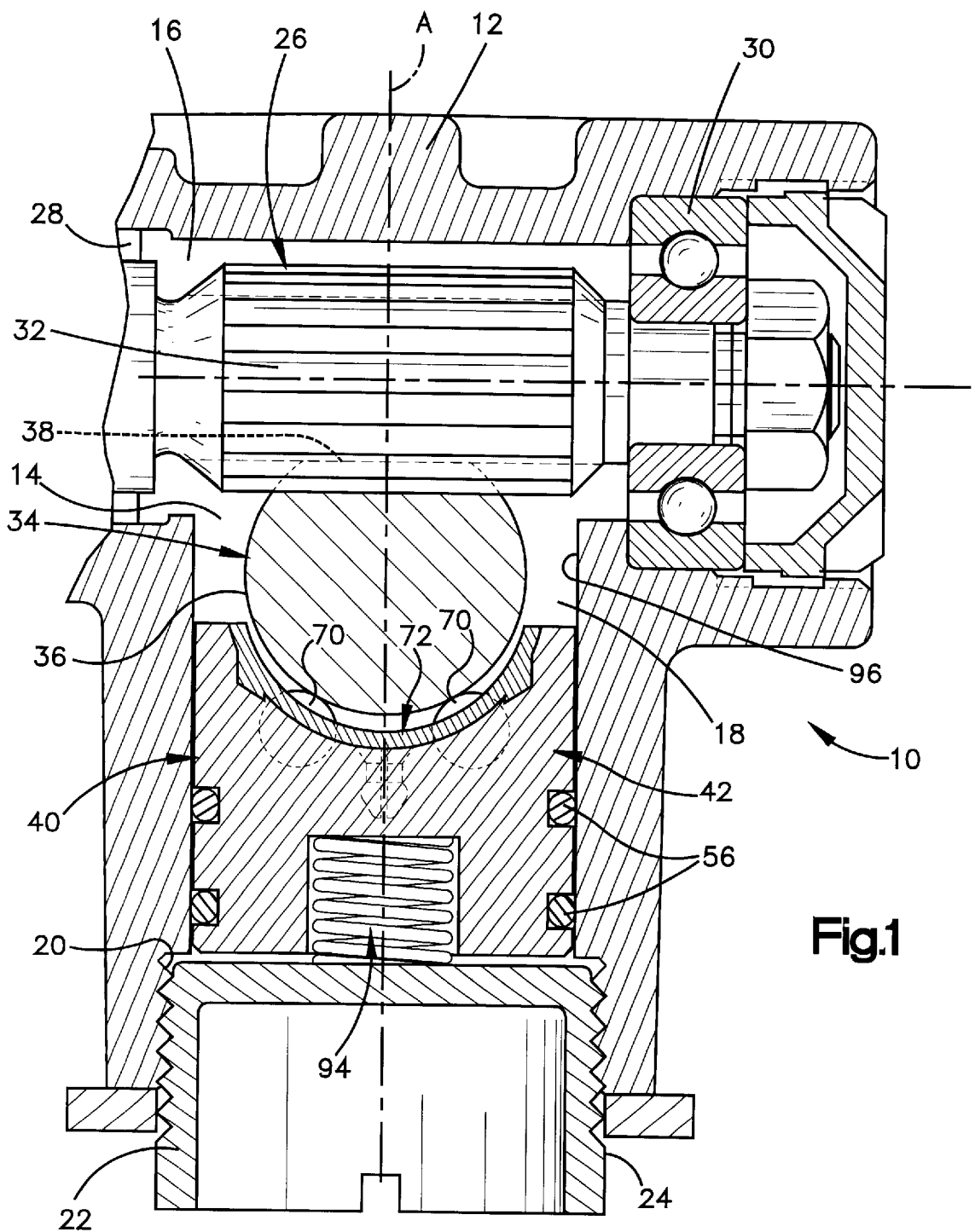
FIG. 1 is a sectional view of a rack and pinion steering gear having a yoke assembly constructed in accordance with the present invention.

A sectional view of the rack and pinion steering gear 10 of the present invention is illustrated in FIG. 1. The rack and pinion steering gear 10 includes a housing 12. Preferably, the housing 12 is made of cast metal. The housing 12 includes a main chamber 14 and a pinion chamber 16 that extends perpendicular to the main chamber 14 and intersects the main chamber 14 within the housing 12. A tubular extension 18 extends from the housing 12 and terminates at a threaded opening 20. A cylindrical plug 22 having a threaded outer surface 24 screws into the threaded opening 20 in the housing 12 to close the housing 12.

A pinion gear 26 is located in the pinion chamber 16 of the housing 12. Two bearing assemblies 28 and 30 rotatably support the pinion gear 26 in the housing 12. The first bearing assembly 28 is located at one end of the pinion gear 26. A second bearing assembly 30 is located at an opposite end of the pinion gear 26.

The pinion gear 26 is connected with the vehicle steering wheel (not shown). Rotation of the vehicle steering wheel causes rotation of the pinion gear 26. A plurality of teeth 32 extends around the outer circumference of the pinion gear 26.

A portion of a longitudinally extending rack bar 34 extends through the main chamber 14 of the housing 12. The rack bar 34 has opposite end portions (not shown) that are connected to the steerable wheels of the vehicle through tie rods (not shown). The rack bar 34 has a generally cylindrical main body 36. An upper surface 38 of the rack bar 34 has a plurality of teeth (not shown). The plurality of teeth of the rack bar 34 is disposed in meshing engagement with the plurality of teeth 32 of the pinion gear 26.

A low friction yoke assembly 40, in accordance with the present invention, is located within the tubular extension 18 extending from the main chamber 14 of the housing 12. The yoke assembly 40 at least partially supports and guides movement of the rack bar 34 relative to the housing 12.

FIG. 4 shows an exploded side view of a yoke assembly 40 constructed in accordance with a preferred embodiment of the present invention. The yoke assembly 40 includes a yoke 42 having a cylindrical main body 44. Preferably, the yoke 42 is made from plastic.

The cylindrical main body 44 of the yoke 42 is centered on axis A. Axis A extends in a direction transverse to the direction of movement of the rack bar 34. The cylindrical main body 44 includes a cylindrical sidewall 46 and axially opposite first and second end surfaces 48 and 50, respectively. The cylindrical sidewall 46 extends parallel to axis A. First and second parallel, circumferentially extending grooves 52 and 54 extend into the sidewall 46 of the cylindrical main body 44. Each groove 52 and 54 has a depth that is sufficient to receive an o-ring 56.

The first end surface 48 of the yoke 42 is arcuate. Four cavities 58, two of which are shown in FIG. 4, extend from the first end surface 48 into the cylindrical main body 44 of the yoke 42. The cavities 58 form circular openings 60 in the first end surface 48 of the yoke 42. The depth of each cavity 58 into the yoke 42 is preferably about sixty percent of the diameter of a ball 70 to be received in the cavity 58. A bottom surface 62 of each cavity 58 is spherical for supporting the ball 70 in the yoke 42.

The second end surface 50 of the yoke 42 is flat and extends in a direction perpendicular to the cylindrical sidewall 46 of the yoke 42, i.e., transverse to axis A. A centrally located bore 64 extends axially into the second end surface 50 of the yoke 42. The bore 64 extends approximately sixty percent of the distance between the second end surface 50 of the yoke 42 and the bottom surface 62 of the respective cavities 58 in the first end surface 48 of the yoke 42. The bore 64 terminates at an inner end surface 66. The bore 64 includes a cylindrical sidewall 68 that extends parallel to the sidewall 46 of the yoke 42 and is centered on axis A.

A centrally located, axially extending stepped bore 69 extends through the yoke 42 from the first end surface 48 to the inner end surface 66. The stepped bore 69 is centered on axis A and is for receiving a protrusion 84 from a yoke cap 72. The stepped bore 69 includes a tapered portion 71 (FIG. 3) that extends from the first end surface 48 of the yoke 42 inwardly. The tapered portion 71 narrows as it extends into the yoke 42. A narrow portion 73 connects to the tapered portion and extends inwardly into the yoke 42. The narrow portion 73 of the stepped bore 69 is cylindrical. The narrow portion 73 connects to a widened portion 75 of the stepped bore 69. The widened portion 75 has a diameter that is greater than a diameter of the narrow portion 73. The widened portion 75 extends to the inner end surface 66. The widened portion 75 curves radially inwardly near the narrow portion 73 of the stepped bore 69 to connect to the narrow portion 73.

The yoke assembly 40 also includes a plurality of balls 70. Preferably, each ball 70 is made from steel. Each ball 70 is spherical. The axis of rotation for each ball 70 is centrally located within the sphere.

One ball 70 is located within each cavity 58 extending into the first end surface 48 of the yoke 42. Thus, the yoke assembly 40 illustrated has four balls 70 (FIG. 2). Each ball 70 is rotatable within a respective cavity 58 and has a radius that is equal to the radius of the respective cavity 58. When located within the respective cavity 58, a portion of the ball 70 projects through the opening 60 on the first end surface 48 of the yoke 42 and outward of the first end surface 48 of the yoke 42. Those skilled in the art will recognize that other rotatable members such as cylindrical or elliptical rollers may be used in combination with or in place of the balls 70.

The yoke assembly 40 further includes a yoke cap 72 for securing the balls 70 in the cavities 58 of the yoke 42. The yoke cap 72 is an arcuate plate having a first surface 74 and a second surface 76 (FIG. 4). The first surface 74 of the yoke cap 72 has a radius of curvature that is less than the radius of curvature of the second surface 76 of the yoke cap 72. The arc of the first surface 74 of the yoke cap 72 has a radius that is greater than a radius of the cylindrical main body 36 of the rack bar 34. Thus, a portion of the rack bar 34 may extend through the arc of the first surface 74 without contacting the first surface of the yoke cap 72, as shown in FIG. 1. The arc of the second surface 76 of the yoke cap 72 is sized and shaped to mate with the first end surface 48 of the yoke 42. As shown in FIG. 1, the second surface 76 of the yoke cap 72 has a radius of curvature that is equal to a radius of curvature of the first end surface 48 of the yoke 42.

Four apertures 78, two of which are shown in FIG. 4, extend through the yoke cap 72 from the first surface 74 to the second surface 76. Each aperture 78 in the yoke cap 72 corresponds to a respective cavity 58 in the yoke 42. Each aperture 78 in the yoke cap 72 forms an opening 80 in the first surface 74 of the yoke cap 72 and an opening 82 in the second surface 76 of the yoke cap 72. Each opening 80 and 82 is circular; however, as shown in FIG. 2, the openings 80 on the first surface 74 of the yoke cap 72 appear to be oval since they are located on an arcuate surface. The openings 80 on the first surface 74 of the yoke cap 72 have a diameter that is less than the diameter of the openings 82 on the second surface 76 of the yoke cap 72. The diameter of the openings 80 on the first surface 74 of the yoke cap 72 is also less than the diameter of the balls 70. Thus, each aperture 78 in the yoke cap 72 has a frustoconical cross-sectional shape, widening from the opening 80 in the first surface 74 of the yoke cap 72 to the opening 82 in the second surface 76 of the yoke cap 72.

The second surface 76 of the yoke cap 72 also includes a centrally located, axially outwardly extending protrusion 84 (FIG. 4). The protrusion 84 includes a head portion 86 that is connected to the second surface 76 of the yoke cap 72 by a neck portion 88. The head portion 86 of the protrusion 84 extends radially outwardly from axis A a distance greater than the neck portion 88 of the protrusion 84. Two axially extending slits 90, one of which is shown in FIG. 4, divide the protrusion 86 into four equal parts and allow for the four parts of the protrusion 84 to be radially compressed. The protrusion 84 is made from a resilient material, preferably plastic, such that once a compressive force is released from the four parts of the protrusion 84, the protrusion 84 will return to its original shape, shown in FIG. 3.

The second surface 76 of the yoke cap 72 may also include a plurality of outwardly extending projections 92, two of which are shown in FIG. 4, for interlocking with slots 93 (FIG. 4) on the first end surface 48 of the yoke 42. The projections 92 are elongated in a circumferential direction along the arc of the second surface 76 of the yoke cap 72 for preventing movement of the yoke cap 72 relative to the yoke 42 as the rack bar 34 moves relative to the yoke assembly 40.

A spring 94 (FIG. 1) is disposed between the inner end surface 66 of the bore 64 in the second end surface 50 of the yoke 42 and the plug 22 in the tubular extension 18 of the housing 12. The spring 94 has a constant compression rate and the biasing force of the spring 94 is proportional to the amount of compression of the spring 94. The distance that the plug 22 is threaded into the threaded opening 20 of the tubular extension 18 of the housing 12 controls the initial compression of the spring 94.

To assemble the yoke assembly 40, the four balls 70 are inserted into the cavities 58 extending into the first end surface 48 of the yoke 42 so that each ball 70 rests on the bottom surface 62 of a respective cavity 58. The yoke cap 72 is then attached to the yoke 42 such that the apertures 78 in the yoke cap 72 align with corresponding cavities 58 in the yoke 42. To attach the yoke cap 72, the protrusion 84 extending from the second surface 76 of the yoke cap 72 is aligned with the stepped bore 69 in the first end surface 48 of the yoke 42. The yoke cap 72 is then pushed axially toward the yoke 42 such that the head portion 86 of the protrusion 84 is compressed and passes through the narrow portion 73 of the stepped bore 69. Once the head portion 86 of the protrusion reaches the widened portion 75 of the stepped bore 69, the head portion 86 of the protrusion 84 returns to its original shape and locks in the widened portion 75 of the stepped bore 69. When the head portion 86 of the protrusion 84 locks in the widened portion 75 of the stepped bore 69, the projections 92 extending from the second surface 76 of the yoke cap 72 are received in slots 93 in the first end surface 48 of the yoke 42. When the yoke cap 72 is attached to the yoke 42, the second surface 76 of the yoke cap 72 is adjacent the first end surface 48 of the yoke 42. An assembled yoke assembly 40 is illustrated in FIGS. 2 and 3.

Annular o-rings 56 are inserted into the circumferential grooves 52 and 54 in the sidewall 46 of the cylindrical main body 44 of the yoke 42. The o-rings 56 prevent noise caused by movement of the yoke assembly 40 in the tubular extension 18 of the housing 12. The o-rings 56 also prevent the yoke assembly 40 from rocking within the tubular extension 18 in the housing 12 during movement of the rack bar 34 relative to the yoke assembly 40.

The assembled yoke assembly 40 is located in the tubular extension 18 of the housing 12 such that the yoke cap 72 is nearest the rack bar 34 (FIG. 1). The sidewall 46 of the cylindrical main body 44 of the yoke 42 contacts and is movable with respect to the inner surface 96 of the tubular extension 18 of the housing 12.

During operation of the rack and pinion steering gear 10, the yoke assembly 40 of the present invention at least partially supports and guides movement of the rack bar 34 with the four balls 70. The spring 94 biases the yoke assembly 40 toward the rack bar 34. Each ball 70 protrudes beyond the first surface 74 of the yoke cap 72 to contact the rack bar 34. During movement of the rack bar 34 relative to the housing 12, the balls 70 rotate within their respective cavities 58 to provide low friction guidance of the rack bar 34. By guiding the rack bar 34 using the balls 70, as opposed to having the rack bar 34 slide over the first surface 74 of the yoke cap 72, the amount of heat generated by friction is minimized.

As the load conditions on the yoke assembly 40 increase, the spring 94 begins to compress. The entire yoke assembly 40 moves toward the plug 22 in the threaded opening 20 of the tubular extension 18 of the housing 12. During this movement, the balls 70 remain in contact with the rack bar 34 and the axis of rotation of each of the balls remains fixed axially along axis A relative to the yoke 42. As load conditions on the yoke assembly 40 decrease, the spring 94 expands and moves the entire yoke assembly 40 away from the plug 22 in the threaded opening 20 of the tubular extension 18 of the housing 12. During movement of the yoke assembly 40, the only portion of the yoke assembly 40 to contact the rack bar 34 is the plurality of balls 70.

From the above description of the invention, those skilled in the art will perceive improvements, changes and modifications. Such improvements, changes and modifications may include a yoke 42 with a flat first end surface 48 and a yoke cap 72 with an arcuate first surface 74 and a flat second surface 76. Such improvements, changes and modifications within the skill of the art are intended to be covered by the appended claims.

Having described the invention, the following is claimed:

1. A rack and pinion steering gear comprising:
    a housing;
    a pinion gear rotatably mounted in the housing;
    a rack bar movable relative to the pinion gear, the rack bar having teeth in meshing engagement with teeth of the pinion gear; and
    a yoke assembly in the housing for at least partially supporting and guiding movement of the rack bar relative to the pinion gear,
    the yoke assembly comprising a yoke and a plurality of rotatable members,
    the yoke having a cylindrical body with a recessed first axial end surface for receiving a portion of the rack bar and a yoke axis extending transverse to the direction of movement of the rack bar, each of the plurality of rotatable members being supported by the yoke, a portion of each rotatable member projecting outward of the recessed first axial end surface of the yoke for contacting the received portion of the rack bar,
    each rotatable member including an axis of rotation, each rotatable member being rotatable about the axis of rotation and being fixed against movement along the yoke axis relative to the first end surface of the yoke.

2. The rack and pinion steering gear of claim 1 further being defined by:
    the plurality of rotatable members rotating during movement of the rack bar relative to the yoke assembly.

3. A rack and pinion steering gear comprising:
    a housing;
    a pinion gear rotatably mounted in the housing;
    a rack bar movable relative to the pinion gear, the rack bar having teeth in meshing engagement with teeth of the pinion gear; and
    a yoke assembly in the housing for at least partially supporting and guiding movement of the rack bar relative to the pinion gear,
    the yoke assembly comprising a yoke and a plurality of rotatable members,
    the yoke having a first end surface and a yoke axis extending transverse to the direction of movement of the rack bar, each of the plurality of rotatable members being supported by the yoke, a portion of each rotatable member projecting outward of the first end surface of the yoke for contacting the rack bar,
    each rotatable member including an axis of rotation, each rotatable member being rotatable about the axis of rotation and being fixed against movement along the yoke axis relative to the yoke,
    the yoke assembly further including a yoke cap for securing the plurality of rotatable members to the yoke, the yoke cap having a first surface and a second surface, a plurality of apertures extending through the yoke cap from the first surface to the second surface, the second surface of the yoke cap attaching to the first end surface of the yoke, one of the plurality of rotatable members extending through each of the plurality of apertures in the yoke cap and outward of the first surface of the yoke cap.

4. The rack and pinion steering gear of claim 3 further being defined by:
    each aperture in the yoke cap forming an opening on the first surface of the yoke cap and an opening on the second surface of the yoke cap,
    the opening on the second surface of the yoke cap having a diameter that is greater than a diameter of the opening on the first surface of the yoke cap.

5. The rack and pinion steering gear of claim 3 further being defined by:
    each aperture in the yoke cap having a frustoconical cross-sectional shape.

6. The rack and pinion steering gear of claim 4 further comprising:
    the diameter of the opening on the first surface of the yoke cap for a respective aperture being less than a diameter of a respective ball that projects from the respective aperture.

7. The rack and pinion steering gear of claim 3 further comprising:
    the yoke cap further including at least one protrusion that extends outwardly from the second surface of the yoke cap, the yoke including a stepped bore for receiving the protrusion and attaching the yoke cap to the yoke.

8. A rack and pinion steering gear comprising:

a housing;

a pinion gear rotatably mounted in the housing;

a rack bar movable relative to the pinion gear, the rack bar having teeth in meshing engagement with teeth of the pinion gear; and a yoke assembly in the housing for at least partially supporting and guiding movement of the rack bar relative to the pinion gear, the yoke assembly comprising a yoke and a plurality of rotatable members, the yoke having a first end surface and a yoke axis extending transverse to the direction of movement of the rack bar, each of the plurality of rotatable members being supported by the yoke, a portion of each rotatable member projecting outward of the first end surface of the yoke for contacting the rack bar, each rotatable member including an axis of rotation, each rotatable member being rotatable about the axis of rotation and being fixed against movement along the yoke axis relative to the yoke, the plurality of rotatable members being a plurality of balls.

* * * * *